United States Patent [19]

Howery et al.

[11] Patent Number: 4,686,277
[45] Date of Patent: Aug. 11, 1987

[54] PROCESS FOR SEPARATING AND POLYMERIZING CYCLIC OLIGOMERIC POLYCARBONATE

[75] Inventors: Richard W. Howery, Mt. Vernon; Niles R. Rosenquist; Robert A. Pyles, both of Evansville; Patrick J. Mulvey, Mt. Vernon, all of Ind.

[73] Assignee: General Electric Company, Mt. Vernon, Ind.

[21] Appl. No.: 812,450

[22] Filed: Dec. 23, 1985

[51] Int. Cl.$^4$ .............................................. C08G 63/62
[52] U.S. Cl. .................................... 528/493; 528/196; 528/370; 528/491
[58] Field of Search ................ 528/493, 491, 196, 370

[56] References Cited

U.S. PATENT DOCUMENTS 3,213,060 10/1965 Jackson et al. ...................... 528/493
3,410,823 11/1968 Cleveland ........................... 528/493

Primary Examiner—Harold D. Anderson
Attorney, Agent, or Firm—Martin B. Barancik

[57] ABSTRACT

A process for separating solid cyclic oligomeric dihydric phenol carbonate from solid high molecular weight linear aromatic polycarbonate which comprises admixing an organic solvent with a composition comprising major quantities of solid high molecular weight linear aromatic polycarbonate and minor quantities of solid cyclic oligomeric dihydric phenol carbonate and separating the cyclic oligomeric dihydric phenol carbonate soluble in the organic solvent from the high molecular weight linear aromatic polycarbonate insoluble in the organic solvent, said organic solvent selected so that a very large fraction of the said solid cyclic oligomer is separated from a very large fraction of the said polycarbonate which remains as a solid in the organic solvent.

5 Claims, No Drawings

PROCESS FOR SEPARATING AND POLYMERIZING CYCLIC OLIGOMERIC POLYCARBONATE

BACKGROUND OF THE INVENTION

Polycarbonate is a well known thermoplastic polymer useful for applications wherein good electrical resistance, distortion temperature under load and impact resistance are valuable properties. There are many known processes for preparing polycarbonate, including inter alia the lime process, the pyridine process, melt polymerization, transesterification, solution process, and interfacial polymerization. Virtually all of these, if not all of these processes, start out initially with a dihydric phenol and a carbonate precursor. As in almost all other reactions there is not 100% yield of the desired high molecular weight aromatic polycarbonate. There are side reactions which bring about product other than the desired polycarbonate. Some of these well known side products are diphenyl carbonate, sodium carbonate, and linear oligomers of the desired polycarbonate. In order to enhance the properties of the polycarbonate it is important to minimize side reaction products present in the polycarbonate. Usually the approach taken is to minimize the side reaction as opposed to removal of the side reaction product because of the additional, sizeable expense involved.

A new and inexpensive method of purifying high molecular weight aromatic polycarbonate has been found. In addition, it has been found that the side reaction product is particularly rich in cyclic polycarbonate oligomers. These oligomers can be isolated and further polymerized to linear high molecular weight polycarbonate per se. A further use of the cyclic oligomers is the addition to or the impregnation with fibrous materials such as glass, carbon or aramid fibers followed by the in situ polymerization of the polycarbonate to form composites having great modulus strength.

SUMMARY OF THE INVENTION

In accordance with the invention, there is a process for separating solid cyclic oligomeric dihydric phenol carbonate from solid high molecular weight linear aromatic polycarbonate which comprises admixing an organic solvent with a composition comprising major quantities of solid high molecular weight linear aromatic polycarbonate and minor quantities of solid cyclic oligomeric dihydric phenol carbonate, and separating the cyclic oligomeric dihydric phenol carbonate soluble in the organic solvent from the high molecular weight linear aromatic polycarbonate insoluble in the organic solvent, said organic solvent selected so that a substantial fraction of the said solid cyclic oligomer is separated from a large fraction of the said polycarbonate which remains as a solid in the organic solvent.

DETAILED DESCRIPTION OF THE INVENTION

Any process can be employed to make the high molecular weight linear aromatic polycarbonate as long as the cyclic oligomer dihydric phenol carbonate side product is also present in solid form with the solid aromatic polycarbonate. A typical reaction procedure which produces cyclic oligomer side product together with the high molecular weight aromatic polycarbonate is interfacial polymerization involving a dihydric phenol and a carbonate precursor. The salt of the dihydric phenol is preferentially soluble in the first phase and the carbonate precursor is preferentially soluble in the second phase. An example of such a polymerization is that carried out to make high molecular weight bisphenol-A polycarbonate wherein an aqueous solution of an alkali metal salt of bisphenol-A at alkaline pH is reacted with phosgene soluble in an organic solvent such as methylene chloride or similar halogenated hydrocarbon such as cis-1,2-dichloroethylene and the like.

Surprisingly, a significant amount of reactants form side products rather than enter the high polymer. Even more surprisingly, a high proportion of these side products are cyclic oligomers. Since a linear high polymer is being formed the usual side product expected would be a linear molecule. For example, typical production runs of aromatic polycarbonate made by the well known interfacial method produced a solid having about 98.5–99.5 weight % bisphenol-A polycarbonate with an intrinsic viscosity of about 0.3 to 1.3 dl/g at 25° C. in methylene chloride. The remaining 0.5–1.5 weight percent is side products of which almost 70 weight percent and generally at least about 50 weight percent can by cyclic oligomer.

The organic solvent which effectively separates the cyclic oligomers from the high molecular weight linear aromatic polycarbonate when both are solids is generally a lower ketone such as acetone or methyl ethyl ketone or a lower alkyl acetate such as methyl and ethyl acetate. Very few solvents have the selectivity in differential solubility to effectively separate solid cyclic oligomers from solid high molecular weight aromatic polycarbonate. The preferred solvent is acetone.

Any dihydric phenol can be employed in the reaction procedure to prepare the aromatic polycarbonate. Examples of such dihydric phenols include:
2,2-bis(4-hydroxyphenyl)propane (bisphenol-A);
2,2-bis(3,5-dimethyl-4-hydroxyphenyl)propane;
2,2-bis(3,5-dibromo-4-hydroxyphenyl)propane;
1,1-bis(4-hydroxyphenyl)cyclohexane;
1,1-bis(3,5-dimethyl-4-hydroxyphenyl)cyclohexane;
1,1-bis(4-hydroxyphenyl)pentane;
bis(4-hydroxyphenyl)methane;
bis(3,5-diethyl-4-hydroxyphenyl)methane;
1,3-bis(4-hydroxyphenyl)propane;
4,4'-thiodiphenol; and
4,4'-dihydroxy-2,6-dimethyldiphenyl ether.

The preferred dihydric phenols are of the formula

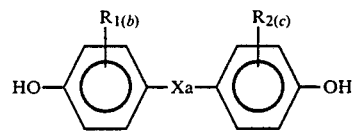

FIG. 1 wherein
a is 0 or 1,
X is alkylene of two to eight carbon atoms, inclusive, alkylidene of one to eight carbon atoms, inclusive,

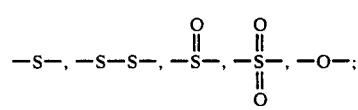

$R_1$ and $R_2$ are the same or different and are alkyl of one to four carbon atoms, inclusive, chloro or bromo, b and c are the same or different and are 0, 1 or 2.

Preferably a is 1, b and c are 0, and X is 2,2-isopropylidene.

Copolymers where there is more than one dihydric phenol are included within the definition of aromatic polycarbonate. Generally the distribution of dihydric phenols in the cyclic oligomer is similar to the distribution in the high polymer. The high molecular weight aromatic polycarbonate generally has a minimum intrinsic viscosity (I.V.) dl/g. of about 0.3 preferably above about 0.4 as measured in methylene chloride at 25° C. The maximum I.V. is not significant, but for processing purposes an I.V. of less than about 1.0 is preferred. The cyclic oligomer dihydric phenol carbonate has an I.V. significantly below 0.3 and generally has no more than about 16 repeat units.

In FIG. 2 below is an example of cyclic oligomer utilizing bisphenol-A as the dihydric phenol.

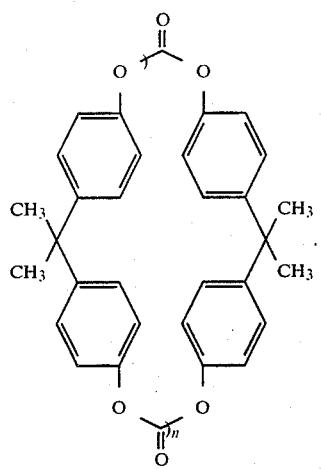

FIG. II n in an integer of 1 to about 15, preferably about 11

The quantity of solvent employed for the separation of cyclic oligomer from high polymer is generally from about 2 to 10 mls of solvent per gram of solid. The solid polycarbonate and cyclic oligomer can merely be slurried together with stirring for sufficient time to allow extraction and the admixture separated by standard means. Obviously the solid material must be in a form such that the organic solvent can contact and penetrate the solid mass so as to extract the cyclic oligomer. A powder or granular form of solid is generally preferred.

Below are examples of various organic solvents showing their nonutility in the invention. Also included are various solvents that do remove cyclic oligomers from aromatic polycarbonate. As is observed, the solvents are highly selective and remove substantially all of the cyclic oligomer. The test data shows the polycarbonate free from the side reaction product to have greater heat resistance as measured by glass transition temperature and better impact resistance after aging at elevated temperature than polycarbonate without the side products removed.

EXAMPLE 1

Preparation of bisphenol-A polycarbonate with cyclic oligomer side product using 4-(3,4-dihydro-2,2,4-trimethyl-2H-1-benzopyran-4-yl)-phenol (Chroman-I) as end-capping agent.

To a reactor fitted with a mechanical agitator are charged 35 liters of deionized water, 35 liters of methylene chloride, 11.35 kg (50 moles) of bisphenol-A, 70 milliliters of triethylamine, 17 grams of sodium gluconate, and 675 g (2.5 moles) of Chroman-I.

Phosgene is introduced at the rate of about 120 grams/minute and phosgenation is continued for forty minutes. The pH is maintained between 9.5 to 11.0 by the addition of 25% aqueous sodium hydroxide. After phosgenation has been terminated 35 liters of methylene chloride are added, the brine layer is separated by centrifuge and the resin solution is washed with aqueous acid and water. The resin is then steam precipitated and dried. The resin was found to have intrinsic viscosity in methylene chloride at 25° C. of 0.409 dl/g.

EXAMPLE 2

The solid polycarbonate and side products from normal manufacturing preparation substantially the same as in Example 1 are isolated and contacted with a number of organic solvents in an attempt to separate the high polymer polycarbonate from the side reaction product. In each of the experiments, 50 grams of bisphenol-A polycarbonate resin were washed with 250 milliliters of the solvent for a period of 30 minutes with stirring. Below are the results:

TABLE 1

| SOLVENT | WT. % SOLUBLE |
| --- | --- |
| None | None |
| H$_2$O | 0 |
| Isopropanol | 0 |
| Methanol | 0 |
| Ethylacetate | 1.2 |
| Acetone | 1.4 |

The material soluble in the organic solvent is analyzed by high pressure liquid chromatography and is found to be approximately 70 weight percent cyclic oligomeric bisphenol-A polycarbonate. The remainder of the material includes linear oligomeric bisphenol-A polycarbonate, diphenylcarbonate as well as undefined materials. The cyclic oligomers can be polymerized to high molecular weight aromatic polycarbonate by standard means such as transesterification.

EXAMPLE 3

Acetone was slurried together with dried bisphenol-A polycarbonate produced in a manner similar to Example 1 and having various intrinsic viscosities for a period of 30 minutes at a level of 100 grams of polycarbonate to 400 grams of acetone. Three runs were made with each intrinsic viscosity polycarbonate to ascertain the quantity of material which went into the solution. Below are the averaged results:

| I.V. 20° C. MeCl$_2$ POLYCARBONATE | WT. % OF MATERIAL IN SOLUTION/ORIGINAL SOLID × 100 |
| --- | --- |
| .49–.52 | 1.13 |
| .53–.55 | 0.83 |
| .56–.58 | 0.83 |

EXAMPLE 4

In the experiments listed below 250 gram samples of bisphenol-A polycarbonate resin prepared in a manner similar to Example 1 were washed in a Waring Blender with 1,000 ml to 1300 ml quantities of acetone. This was repeated eight times so that 2000 grams of resin were washed. These solid polycarbonate samples were air dried three days, then extruded with 0.03 phr of a phosphite color stabilizer at 260° C. and then injection molded at 300° C. In the Tables below intrinsic viscosity is measured at 25° C. in dl/g. in methylene chloride. Tg, glass transition temperature also known as secondary transition temperature, is a measure of the thermal resistance and is measured by standard procedure. The Mw/Mn ratio defines resin's polydispersity. Mw is weight average molecular. Mn is number average molecular weight. The lower the ratio, the lower the polydispersity of the aromatic polycarbonate resin. The lower the polydispersity the more uniform is the molecular weight distribution of the resin. The Notched Izod is measured according to ASTM D256 in kgf-cm/cm, both before and after oven aging at 90° C. for extended periods of time. The superscript represents the percent ductility at break.

TABLE 2

| SAMPLE | POLYCARBONATE END CAP | ACETONE WASHING | I.V. | Tg °C. | Mw/Mn |
|---|---|---|---|---|---|
| 1 | Phenol | No | 0.467 | 148 | 2.34 |
| 2 | Phenol | Yes | 0.475 | 150 | 2.12 |
| 3 | Chroman-I | No | .409 | 148 | 2.30 |
| 4 | Chroman-I | Yes | .416 | 150 | 1.99 |

TABLE 3

| SAMPLE | POLYCARBONATE END CAP | ACETONE WASH | N.I. 3.2 mm kgf-cm/cm | | | | | | | |
|---|---|---|---|---|---|---|---|---|---|---|
| | | | 0-HR | 24 HR | 48 HR | 72 HR | 96 HR | 120 HR | 168 HR | 336 HR |
| 1 | Phenol | No | $87.0^{100}$ | $58.2^{60}$ | $13.6^{0}$ | $13.6^{0}$ | $12.5^{0}$ | $11.4^{0}$ | $10.9^{0}$ | $18.0^{0}$ |
| 2 | Phenol | Yes | $87.0^{100}$ | $87.0^{100}$ | $44.1^{40}$ | $56.7^{60}$ | $69.1^{80}$ | $70.2^{80}$ | $56.6^{60}$ | $21.8^{0}$ |
| 3 | Chroman-I | No | $75.6^{100}$ | $60.9^{80}$ | $16.3^{0}$ | $28.3^{20}$ | $18.0^{0}$ | — | — | — |
| 4 | Chroman-I | Yes | $78.3^{100}$ | $72.3^{100}$ | $64.7^{80}$ | $74.5^{100}$ | $64.2^{80}$ | — | — | — |

As is readily observed from the above data, the intrinsic viscosity and the secondary transition point are both raised by the acetone wash, showing that "low ends" have been removed from the polycarbonate. Finally the polydispersity ratio's downward movement shows that the polycarbonate chains are more uniform in length. This is in further support of the removal of low ends.

The data of Table 3 demonstrates that the purer, less random polycarbonates provide better impact resistance after aging at an elevated temperature over an extended time period than the normal, non-acetone washed polycarbonates.

What is claimed is:

1. A process for separating solid cyclic oligomeric dihydric phenol carbonate from solid high molecular weight linear aromatic polycarbonate which comprises admixing an organic solvent with a composition comprising major quantities of solid high molecular weight linear aromatic polycarbonate and minor quantities of solid cyclic oligomeric dihydric phenol carbonate to dissolve cyclic oligomeric carbonate but not aromatic polycarbonate; separating the cyclic oligomeric dihydric phenol carbonate soluble in the organic solvent from the high molecular weight linear aromatic polycarbonate insoluble in the organic solvent, said organic solvent selected so that a very large fraction of the said solid cyclic oligomer is separated from a very large fraction of the said polycarbonate which remains as a solid in the organic solvent and polymerizing the cyclic oligomeric dihydric phenol carbonate to linear high molecular weight polycarbonate.

2. The process in accordance with claim 1 wherein the organic solvent is selected from the group consisting of lower alkyl acetates and lower ketones.

3. The process in accordance with claim 2 wherein the solvent is ethyl acetate.

4. The process in accordance with claim 2 wherein the solvent is acetone.

5. The process in accordance with claim 2 wherein the solid cyclic oligomeric dihydric phenol carbonate is prepared in the same process that prepares the linear high molecular weight aromatic polycarbonate.

* * * * *